United States Patent [19]
Romesburg

[11] Patent Number: 5,690,378
[45] Date of Patent: Nov. 25, 1997

[54] MONOCOQUE TRANSPORT VEHICLE

[76] Inventor: R. Bruce Romesburg, 15205 S. 1800 W., Bluffdale, Utah 84065

[21] Appl. No.: 188,937

[22] Filed: Jan. 31, 1994

[51] Int. Cl.$^6$ ............................................. B62D 63/06
[52] U.S. Cl. ........................ 296/181; 296/193; 296/197
[58] Field of Search ............................... 296/181, 178, 296/901, 156, 185, 187, 193, 196, 197, 203

[56] References Cited

U.S. PATENT DOCUMENTS

| | | | |
|---|---|---|---|
| 2,883,233 | 4/1959 | Beckley | 296/181 |
| 3,003,810 | 10/1961 | Kloote et al. | 296/181 |
| 3,163,435 | 12/1964 | Krueger et al. | 296/181 X |
| 4,500,132 | 2/1985 | Yoder | 296/181 X |
| 4,537,441 | 8/1985 | McCleary | 296/181 |

*Primary Examiner*—Joseph D. Pape
*Attorney, Agent, or Firm*—Workman, Nydegger & Seeley

[57] ABSTRACT

A monocoque transport trailer of the invention has a monocoque body shell of unitary construction including sides, top and floor. The trailer has wheel wells and provisions for doors and windows in the shell. The trailer is constructed using standard monocoque unitary molding principles and processes. Of particular importance is the attachment of independent axle and suspension equipment to the underside of the trailer by plate braces and specialty epoxies, so that support wheel assemblies are mounted in molded wheel wells. The monocoque construction provides sufficient strength and rigidity as that of an independent chassis or undercarriage platform.

27 Claims, 4 Drawing Sheets

MONOCOQUE TRANSPORT VEHICLE

BACKGROUND OF THE INVENTION

This invention relates to an improved design for a monocoque transport trailer. For years the transportation industry has relied on technology born in the 1920's. All transportation vehicles are of similar design characteristic, that being, a lower frame consisting of longitudinal and horizontal support beams using a variety of materials as floor coverings. Sidewalls and roof structure are bolted or welded to the frame. Until recently, transport vehicles were constructed of steel. Currently, most transporters are constructed of aluminum. The benefits of an aluminum transporter are seen as a reduction of weight and a minimum amount of corrosion. Conversely, aluminum will fatigue under flex conditions and strength characteristics are diminished when welded.

The invention, hereby submitted, defines a totally different design and manufacturing method to produce transport vehicles. The design, materials of choice, and manufacturing techniques were born within the aerospace industry. Aerospace concepts, when applied to the designs submitted, will produce vehicles exhibiting tremendous improvements in strength, weight reduction, and aerodynamic characteristics over existing transport vehicle designs.

SUMMARY OF THE INVENTION

The uniqueness of this design as compared to designs currently being used, is its total absence of an internal support frame for floor, sidewalls and roof. The designs, as submitted, allow the transport vehicle to carry weight and stress loads throughout the entire vehicle. The generated loads are carried equally within the outside and inside skins of the composite structure.

The vehicle may be constructed in two halves from a pair of female molds. When the two halves are mated, the vehicle becomes a full monocoque structure capable of carrying substantial weight. The design dissipates fatiguing point load conditions which are a common problem associated with conventional vehicles relying on internal framework. The molded design concept facilitates the use of aerodynamic shapes. The use of laminated fabrics, graphite being pre-eminent, provide the stiffness requirement while reducing a considerable amount of weight. The detailed design, the choice of materials and matrix, and the manufacturing process, including tooling versatility and vehicle assembly techniques are combined to create a "new generation" of transport vehicles.

The invention, as set forth, has application in all areas of transportation. Vehicles which will benefit from the design and construction method of this invention include; cargo trailers, tank trailers, cargo vans, flatbed trailers, horse trailers, car haulers, motor homes, travel trailers, campers, people movers, light rail cars, busses, and other forms of wheeled transport vehicles.

THE DRAWINGS

A preferred embodiment of the invention is illustrated in the accompanying drawings in which.

DETAILED DESCRIPTION OF THE PREFERRED EMBODIMENT

Figure 1:
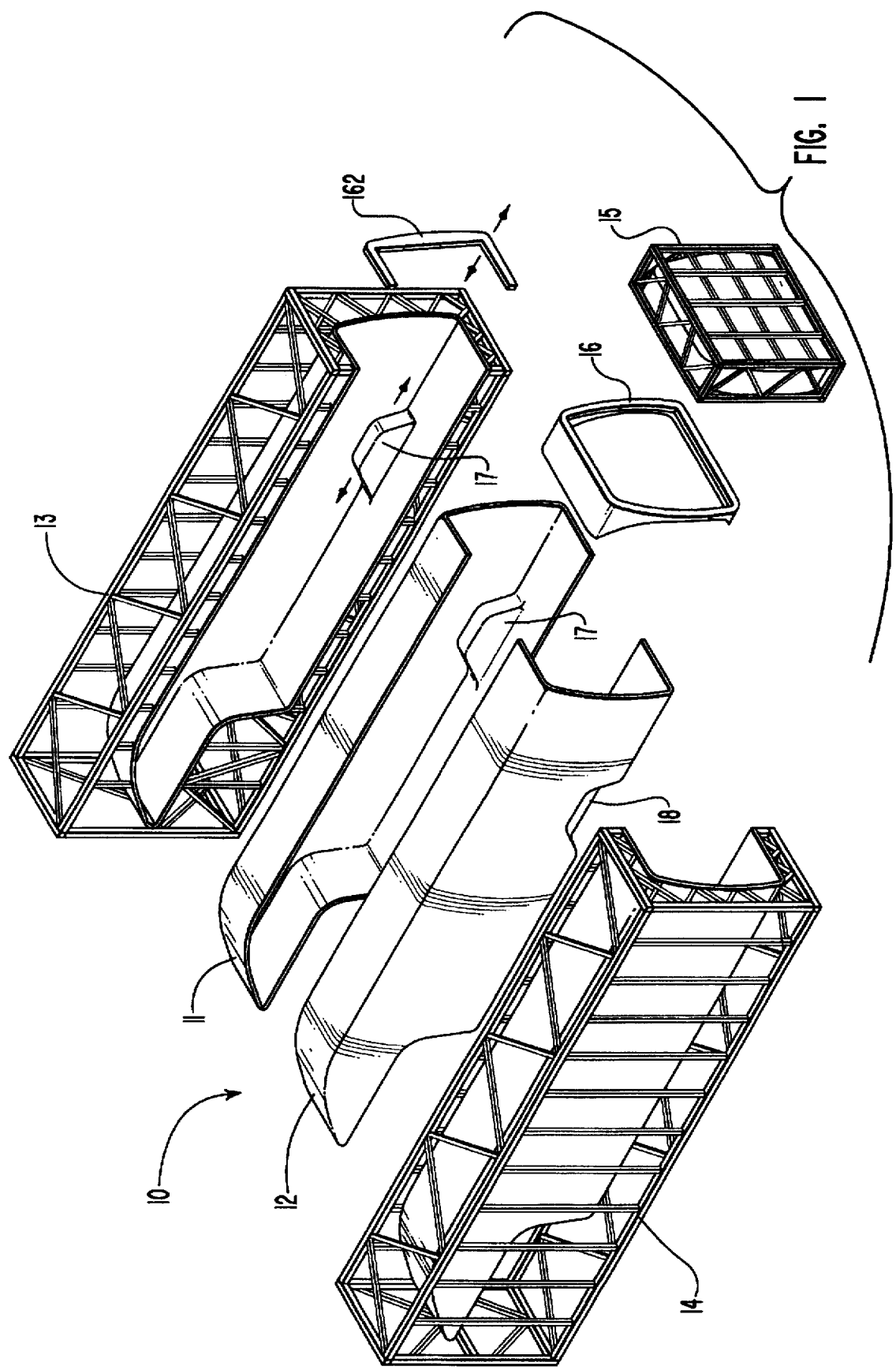
FIG. 1 is an exploded view of a monocoque trailer mold and trailer showing the trailer in two lateral halves.

As shown in the attached drawings, a trailer using a monocoque design 10 is shown having two lateral sections 11, 12 in FIG. 1. The trailer 10 is formed in halves 11, 12 using molds 13, 14, which are separable along the center line. The molds for both sides 13, 14 and the rear section mold 15 are of standard mold construction for large surface molded trailers. Rear section mold 15 produces a rear section 16, which can be open—centered as shown in FIG. 1, or can be closed. Alternatively an adjustable rear mold section 162 can be adjusted forwardly or rearwardly of the mold body depending upon requirements, such as the length of the trailer, so as to be attached to the ends of side section molds 13, 14 to form a rear section (not shown) which is part of the side section. The positioning of the wheel wells 17, 18 can be adjusted forwardly or rearwardly of the mold body depending upon requirements, such as the length of the trailer, weight requirement of the trailer, the number of wheels per well, and the like.

Figure 2:
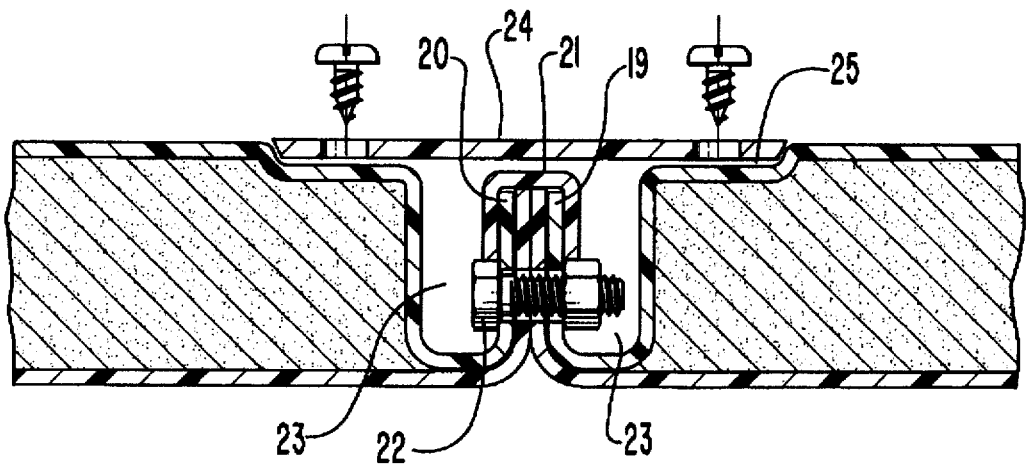
FIG. 2 is a detail of the point of attachment for the two halves of the trailer shown in FIG. 1.

FIG. 2 illustrates a preferred means for attaching the two lateral halves of the trailer together. The trailer mold fabricates a lip 19, 20 on each half, which two lips 19, 20 are fastened together using a U-shaped member 21 and a nut and bolt arrangement 22. The cavity 23 is filled with epoxy foam and a floor plate 24 is attached in a floor depression 25 to form a smooth, flat floor joint which is virtually as strong as the molded body.

Figure 3:
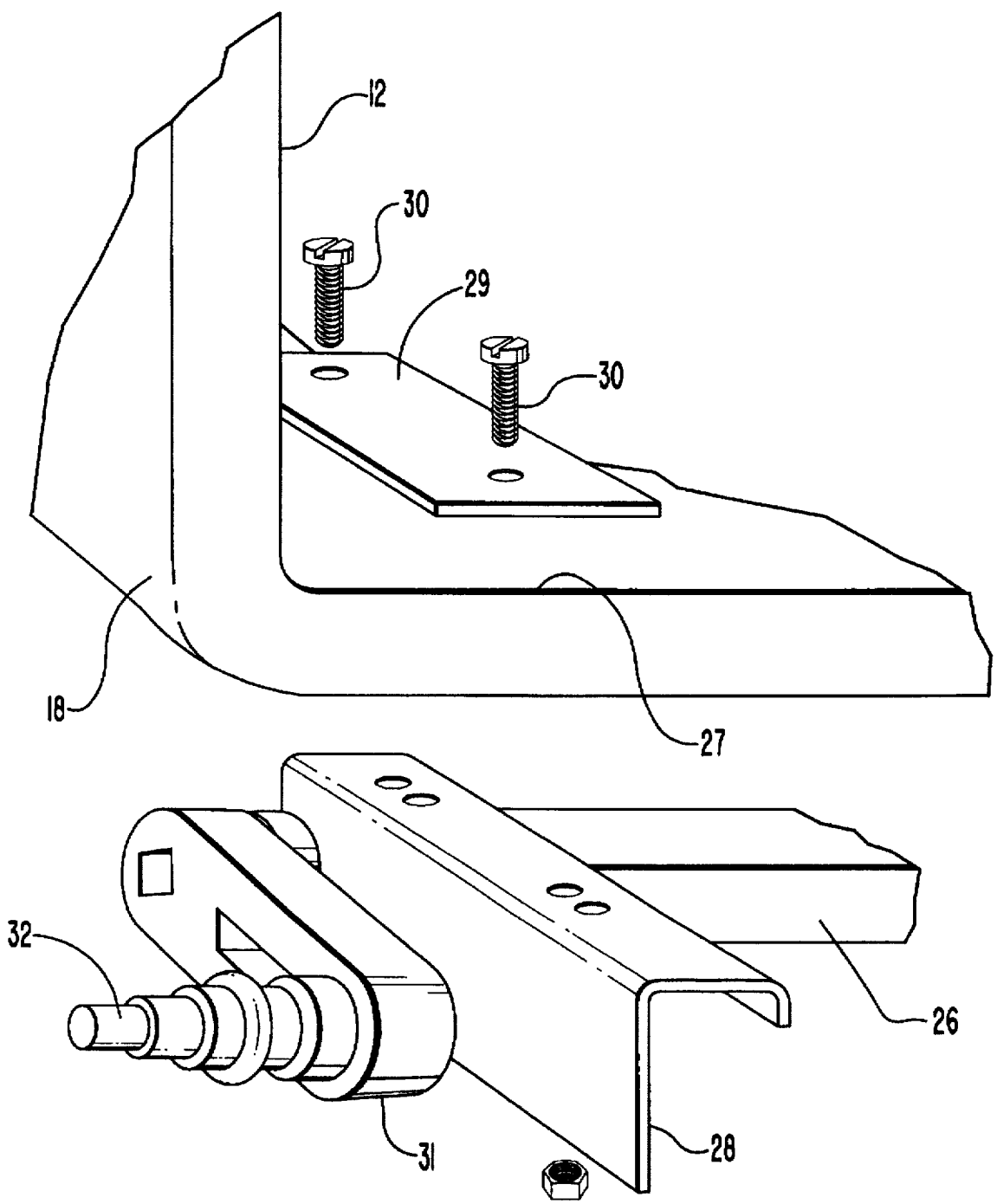
FIG. 3 is a detail of the attachment means for the wheel and axle assembly to the bottom of the trailer.

FIG. 3 shows the important means for attaching the wheel axle 26 to the floor 27 of a trailer 10. Axle 26 has an axle bracket 28 which is secured to the underside of the trailer floor 27 by means of a brace plate 29 attached to the upper side of trailer floor 27. Bolts 30 or the like can be used to secure the brace plate 29 to the floor 27 and axle bracket 28. A torsion arm 31 is secured to the end of axle 26 to function as a shock absorber for the trailer 10. A wheel-mounting spindle 32 extends from torsion arm 31 to accommodate the mounting of a wheel. This arrangement is established for each wheel well 17, 18 of the trailer.

Figure 4:
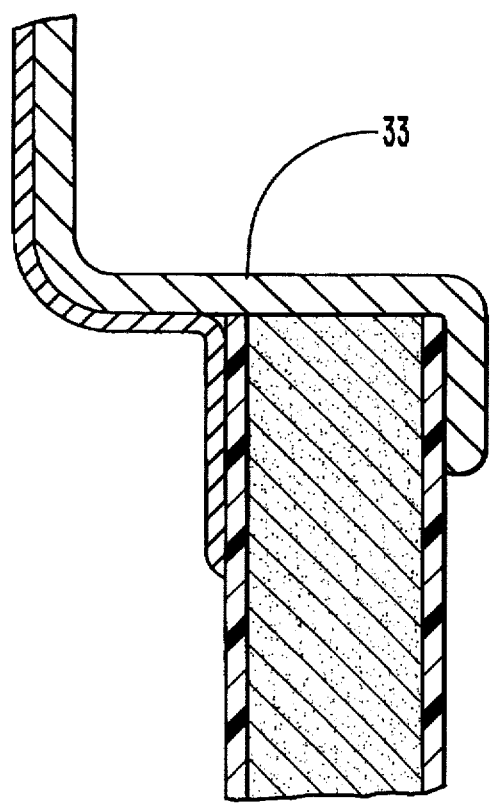
FIG. 4 is a detail of a door jamb assembly as attached to the edge of the side wall.

As shown in FIG. 4, doors are provided in the trailer 10 by epoxying a door jamb 33 to an opening created in the trailer side 11, 12 at the desired location. A door can then be mounted in conventional fashion.

Figure 5:
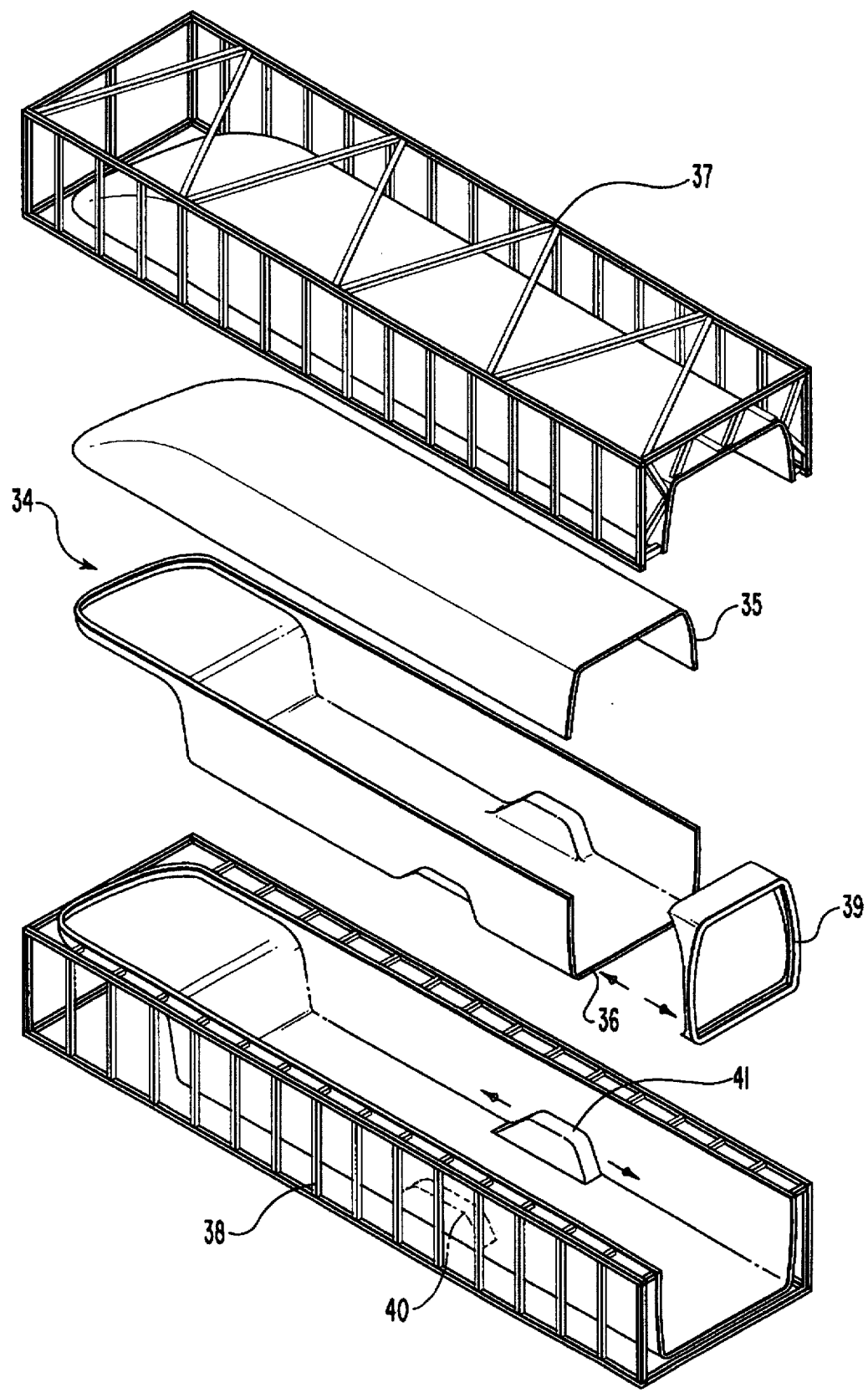
FIG. 5 is an exploded view of a monocoque trailer mold and trailer showing the trailer in two vertical halves.

FIG. 5 illustrates a monocoque construction of a trailer 34 having two vertical halves 35, 36. Mold halves 37, 38 correspond to the vertical halves of the trailer; and a rear section 39 is fabricated similarly to the arrangement shown in FIG. 1. Lower mold half 38 has laterally adjustable wheel well mold shells 40, 41 that permit the wheel wells to be located where necessary, similarly to the mode of adjustment set forth above in FIG. 1.

The left and right or top and bottom of the structure are manufactured from a male or female mold. Several laminates of specific materials form the outer and inner laminate structure with a core placed between the laminates. This method of construction is commonly called a "sandwich" type of construction. The "sandwich" panels may be molded by using one of several manufacturing processes.

A first process, called open cast processing, is accomplished by spraying fibers impregnated with catalyzed resin, or hand laying pressed or woven fibers which are then impregnated with catalyzed resin into or onto a mold surface which has been treated with release agent. The laminated part may cure ambiently or may be forced cured by the use of external heat.

A second process, called vacuum bag processing, is similar to the open cast process. Whereas the open cast process requires the laminate to have trapped air rolled or squeegeed to the surface, the vacuum bag process achieves the removal of trapped air within the laminate by the use of a plastic bag draped over the laminate. The bag is sealed along the mold flanges. Once sealed, a vacuum is pulled against the laminate, forcing the trapped air within the laminate to a relief port. This process may be used in conjunction with a wet laminate or a dry laminate of fibers that are pre-impregnated (pre-preg) with resin. Either ambient or forced cure method may be used to cure laminate.

A third process, called autoclave processing, is similar to the vacuum bag process. Rather than the use of a vacuum bag, the mold, with laminate installed, is placed in a heat and pressure chamber for curing.

Additional processes or lamination such as 'resin transfer," "compression molding," or "filament winding," and "fiber placement" may be used. However, the processes of open cast, vacuum bag, and autoclave are more practical.

In consideration of fixturing costs, mold cycle time, material cost, weight savings, and strength characteristics of the structure produced, the method of choice for manufacturing a transport vehicle would be that of a vacuum bag process using 250 degree epoxy resin pre-impregnated into glass, graphite, and aramid (aromatic polyamide) fibers. The vacuum bagged laminate would be placed in an oven maintaining a 250 degree temperature throughout cure cycle.

The "sandwich" construction method used to manufacture the monocoque structure requires materials designed to carry varying load weights over the length and width of the structure. In addition, the impact resistance required throughout the structure may vary from one area of the structure to another. Thus, the type of materials used and the number of laminates and or the thickness of the core, will vary from one structure to another.

1. Gelcoat: Polyester (N.P.G. or ISO.), vinylester, epoxy
2. Resin: (wet or pre-preg)—Polyester, vinylester, epoxy, urethane, phenolic
   Fibers:
   Materials: fiberglass, graphite, aramid, polyester, nylon, spectra
   Fiber Placement: random mat, unidirectional, non-woven, woven, spool or center pull, in any variation of laminate.
4. Core:
   a. Honeycomb Core—paper, "Nomex", aluminum, glass
   b. Foam Core—polyester, epoxy, phenolic, urethane, PVC styrofoam syntactic
   c. Solid Core—balsa wood, balsa mat, core mat, plywood, hardwood, masonite, steel, aluminum, plastic, rubber.

The molds used to manufacture the laminated structure may be designed in several configurations. A split mold may be used to manufacture a seamless structure; although the cost of such a mold and the difficulty in placing the laminates, cores and vacuum bagging the part, make the process unattractive. The method of choice would be the use of left and right side or top and bottom molds producing parts to be mated upon demolding.

Due to the cost of a set of molds, it is beneficial to design the molds to be as versatile as possible. For this reason, the molds, as illustrated, are equipped with removable and adjustable mold inserts. Specifically, the length and width of a part may be determined by sliding the end and width dams to the desired location, creating a structure of any length or width less than the total length or width of the mold. In the case of a transport trailer, fender well mold inserts will allow vehicle axles to be placed at optimum location. Doors and window jams may be created in a similar fashion.

Once the mold dams and inserts are in place, a mold release agent is applied.

Due to the nature of this invention, that being the elimination of an internal frame, it is imperative that the laminate composition deal with all aspects of structural integrity. Some of these issues include: tensile strength, shear strength, compression strength, bending or deflection strength, boundary conditions, forces created at fixity or point load conditions, and reactionary forces.

Once the transport vehicle application has been defined, all engineering data is fed into a computer equipped with a finite element program for the purpose of choosing the specific materials to be used, the number and weight of plies required, and the matrix in which the plies are installed. Additionally, a core material will be chosen to compliment with inner and outer laminate skins.

Components to be installed on a completed structure, such as trailer axles and hitch, create stress loads at area of fixity. The stress loads generated must be distributed throughout the entire floor, side wall and roof. When thru-bolting a component to the structure, it is imperative that the loads be distributed to both the inner and outer laminate skins. When encountering higher stress loads at points of fixity, additional plies of fabric will be required in localized areas. In addition, it may be necessary to increase shear and/or compression strengths of the core at these localized areas. This can be accomplished by substituting metal or high density foam as core material. Steel or nylon sleeves may also be used to encapsulate mounting bolts.

The preferred laminate process for producing the monocoque trailer has the following steps:

1. Apply gelcoat (polyester, vinylester, or epoxy) to mold surface. If polyester is used, a mechanical or chemical bonding agent will be required to accomplish proper bonding to epoxy resin impregnated in laminate fibers. If structure is to be painted after demolding, no gelcoat is required.
2. Apply outer skin laminates as required. Apply additional localized reinforcement as required.
3. Install vacuum bag; draw vacuum; heat cure in oven.
4. Remove bag, apply bonding skin in preparation for core installation.
5. Install core material.
6. Apply localized reinforcement as required.
7. Apply inner skin laminates as required.
8. Install vacuum bag; draw vacuum; heat cure in oven.
9. Remove bag; de-mold part.

In assembling the molded trailer, the following steps are followed: Mate left and right sides.
   a. Prep flanges and apply epoxy bonding agent.
   b. Align halves and bolt together (12 in. on-center)
   c. Install p.v.c. mailing tube in floor splice line cavity.
   d. Epoxy bond cover plate at floor splice line cavity.
   e. Install epoxy seam tape at floor splice line cavity.
   f. Inject urethane foam in floor splice line cavity.
   1. Install hitch assembly by thru-bolting (6 in. on-center)
   2. Install axle brackets by thru-bolting
   3. Install additional hardware as required.

While this invention has been described and illustrated herein with respect to preferred embodiments, it is understood that alternative embodiments and substantial equivalents are included within the scope of the invention as defined by the appended claims.

I claim:

1. A chassisless trailer of monocoque design for chassislessly carrying a load comprising:

At least two molded sections joined together to form a chassisless unitary monocoque shell for supporting the weight of said load, said monocoque shell having a shell floor on an underside thereof;

At least two wheel wells in the monocoque shell for accommodating a plurality of wheels;

A rear section attachable to the monocoque shell to enclose the rear of the monocoque shell;

Axle mounting means for mounting at least one axle assembly to the underside of the shell floor corresponding to the wheel wells in the monocoque shell, and for bearing the weight of said load from the monocoque shell, said axle mounting means having a port support on the port side of the monocoque shell that is laterally separated from a starboard support on the starboard side of the monocoque shell, the starboard and port supports bearing the weight of said load without a member extending between the port and starboard supports that bears the weight of said load; and Axle means including suspension means mounted to the underside of the monocoque shell with the axle mounting means for rotatably supporting and for transferring weight thereon to said plurality of wheels; whereby the weight of said load is transferred chassislessly from the monocoque shell to the plurality of wheels.

2. A trailer as set for the in claim 1, in which the two sections of the molded trailer shell are lateral sections.

3. A trailer as set forth in claim 1, in which the two sections of the molded trailer shell are vertical sections.

4. A chassisless transport vehicle for transporting a load while chassislessly supporting the weight of said load, said vehicle comprising:

floor structural means, having a chassisless structure, and a top side opposite a bottom side, for supporting the weight of said load and comprising:
   a floor inner skin laminate;
   a floor outer skin laminate; and
   a floor core in between said floor inner and outer skin laminates;

axle means for rotatably supporting and transferring weight thereon to a plurality of wheels; and axle attachment means for directly transferring the weight of said load from the floor structural means to said axle means, and for connecting said axle means to said floor structural means, said axle attachment means having a port support on the port side of the floor structural means that is laterally separated from a starboard support on the starboard side of the floor structural means, the starboard and port supports bearing the weight of said load without a member extending between the port and starboard supports that bears the weight of said load;

whereby the weight of said load is chassislessly transferred from the floor structural means to said plurality of wheels.

5. A transport vehicle as defined in claim 4, wherein said axle attachment means further comprises means for localized strengthening of at least one of said floor outer skin laminate and said floor core.

6. A transport vehicle as defined in claim 4, wherein said floor structural means further comprises wheel well means, conforming in shape to and providing a clearance for wheels supported by said axle means.

7. A transport vehicle as defined in claim 4, wherein said floor structural means has a front section parallel to a rear section, and a middle section connecting and extending at an obtuse angle from said front and rear sections, whereby said floor structural means has a goose neck shape.

8. A transport vehicle as defined in claim 4, wherein said floor inner and outer skin laminates are formed from materials comprising gelcoat, resin, and fiber.

9. A transport vehicle as defined in claim 8, wherein said gelcoat is selected from the group consisting of polyester, vinylester, and epoxy.

10. A transport vehicle as defined in claim 8, wherein said resin is selected from the group consisting of polyester, vinylester, epoxy, urethane, and phenolic.

11. A transport vehicle as defined in claim 8, wherein said fiber is selected from the group consisting of fiber glass, graphite, aramid, polyester, nylon, and spectra.

12. A transport vehicle as defined in claim 4, wherein said floor core is selected from the group consisting of paper, NOMEX™, aluminum, glass, polyester, epoxy, phenolic, urethane, PVC styrofoam syntactic, balsa wood, balsa mat, core mate, plywood, hardwood, masonite, steel, aluminum, plastic, and rubber.

13. A transport vehicle as defined in claim 4, further comprising:

means, connected along a length of and extending at an angle from said floor structural means, for providing a side wall to said transport vehicle, and comprising:
   a side wall inner skin laminate;
   a side wall outer skin laminate; and
   a side wall core in between and in contact with both said side wall inner and outer skin laminates;

wherein said floor structural means transfers, at least in part, the load stress from the weight of said load to said side wall means.

14. A transport vehicle as defined in claim 13, further comprising:

means, connected along a length of and extending at an angle from both said floor structural means and said side wall means, for providing a rear wall to said transport vehicle, and comprising:
   a rear wall inner skin laminate;
   a rear wall outer skin laminate;
   a rear wall core in between and in contact with both said rear wall inner and outer skin laminates;

wherein said floor structural means transfers, at least in part, the load stress from the weight of said load to both side wall means and said rear wall means.

15. A transport vehicle as defined in claim 13, further comprising:

means, connected along a length of and extending at an angle from both said floor structural means and said side wall means, for providing a front wall to said transport vehicle, and comprising:
   a front wall inner skin laminate;
   a front wall outer skin laminate; and
   a front wall core in between and in contact with both said front wall inner and outer skin laminates;

wherein said floor structural means transfers, at least in part, the load stress from the weight of said load to the front wall means and the side wall means.

16. A transport vehicle as defined in claim 15, wherein said floor structural means and said side wall means have wheel well means, situated therebetween, conforming in shape to and providing a clearance for wheels supported by said axle means.

17. A transport vehicle as defined in claim 13, further comprising:
means, parallel to said floor structural means, connected along a length of and extending at an angle from said side wall means, for providing a roof to said transport vehicle, and comprising:
a roof inner skin laminate;
a roof outer skin laminate;
a roof core in between and in contact with both said roof inner and outer skin laminates;
wherein said floor structural means transfers, at least in part, the load stress from the weight of said load to both side wall means and said roof means.

18. A transport vehicle as defined in claim 14, further comprising:
means, connected along a length of and extending at an angle from said floor structural means, said side wall means, and said roof means, for providing a front wall to said transport vehicle, and comprising:
a front wall inner skin laminate;
a front wall outer skin laminate; and
a front wall core in between and in contact with both said front wall inner and outer skin laminates;
wherein said floor structural means transfers, at least in part, the load stress from the weight of said load to the side wall means, the roof means, and the front wall means.

19. A transport vehicle as defined in claim 14, wherein comprising:
means, parallel to said floor structural means, connected along a length of and extending at an angle from said side wall means, for providing a roof to said transport vehicle, and comprising:
a roof inner skin laminate;
a roof outer skin laminate;
a roof core in between and in contact with both said roof inner and outer skin laminates;
wherein said floor structural means transfers, at least in part, the load stress from the weight of said load to said roof means.

20. A transport vehicle as defined in claim 14, wherein both said rear wall means has a aperture through the rear wall inner skin laminate, the rear wall outer skin laminate, and the rear wall core for a window.

21. A chassisless transport vehicle for transporting a load while chassislessly supporting the weight of said load, said vehicle comprising:
floor structural means, having a chassisless structure, and a top side opposite a bottom side, for supporting the weight of said load and comprising:
a floor inner skin laminate;
a floor outer skin laminate; and
a floor core in between said floor inner and outer skin laminates;
axle means for rotatably supporting and transferring weight thereon to a plurality of wheels; and
axle attachment means for directly transferring the weight of said load from said floor structural means to said axle means, and for connecting said axle means to said floor structure means, said axle attachment means having a port support on the port side of the floor structural means that is laterally separated from a starboard support on the starboard side of the floor structural means, the starboard and port supports bearing the weight of said load without a member extending between the port and starboard supports that bears the weight of said load;
means, connected along a length of and extending at an angle from said floor structural means, for providing a side wall to said transport vehicle, and comprising:
a side wall inner skin laminate;
a side wall outer skin laminate; and
a side wall core in between and in contact with both said side wall inner and outer skin laminates;
means, connected along a length of and extending at an angle from both said floor structural means and said side wall means, for providing a front wall to said transport vehicle, and comprising:
a front wall inner skin laminate;
a front wall outer skin laminate; and
a front wall core in between and in contact with both said front wall inner and outer skin laminates; and
means, parallel to said floor structural means, connected along a length of and extending at an angle from said side wall means and said front wall means, for providing a roof to said transport vehicle, and comprising:
a roof inner skin laminate;
a roof outer skin laminate; and
a roof core between and in contact with both said roof inner and outer skin laminates;
whereby the weight of said load is chassislessly transferred from said floor structural means to said plurality of wheels.

22. A transport vehicle as defined in claim 21, wherein said floor structural means and said side wall means have wheel well means, situated therebetween, conforming in shape to and providing a clearance for wheels supported by said axle means.

23. A transport vehicle as defined in claim 21, wherein said floor structural means has a front section parallel to a rear section, and a middle section connecting and extending at an obtuse angle from said front and rear sections; whereby said floor structural means has a goose neck shape.

24. A chassisless transport vehicle for transporting a load while chassislessly carrying the weight of the load, said vehicle comprising:
a left laminate section and a right laminate section joined together as a chassisless unitary monocoque structure, each laminate section being chassisless and having a concave shaped cross-section, and each of said left and right laminate section comprising:
an inner skin laminate;
an outer skin laminate; and
a core in between said inner and outer skin laminates;
axle means for rotatably supporting and transferring weight thereon to a plurality of wheels; and
axle attachment means for directly transferring the weight of said load from said axle means to said chassisless unitary monocoque structure, and for connecting said axle means to said left and right laminate sections, said axle attachment means having a port support on the port side of the chassisless unitary monocoque structure that is laterally separated from a starboard support on the starboard side of the chassisless unitary monocoque structure, the starboard and port supports bearing the weight of said load without a member extending between the port and starboard supports that bears the weight of said load;
whereby the weight of said load is chassislessly transferred from the chassisless unitary monocoque structure to said plurality of wheels.

25. A transport vehicle as defined in claim 24, wherein said left and right laminate sections each have wheel well means, conforming in shape to and providing a clearance for wheels supported by said axle means.

26. A transport vehicle as defined in claim 24, wherein said left and right laminate sections each have a goose neck surface thereon comprising a front section parallel to a rear section, and a middle section connecting and extending at an obtuse angle from said front and rear sections.

27. A transport vehicle as defined in claim 24, wherein at least one of said left and right laminate sections is formed in a laminate molding process selected from the group consisting of open cast processing, vacuum bag processing, autoclave processing, resin transfer processing, compression molding processing, filament winding processing, and fiber placement processing.

* * * * *